(12) United States Patent
Mikami

(10) Patent No.: US 8,855,502 B2
(45) Date of Patent: Oct. 7, 2014

(54) DEMODULATOR AND OPTICAL TRANSCEIVER

(75) Inventor: Hideharu Mikami, Kawasaki (JP)

(73) Assignee: Oclaro Japan, Inc., Kanagawa (JP)

( * ) Notice: Subject to any disclaimer, the term of this patent is extended or adjusted under 35 U.S.C. 154(b) by 393 days.

(21) Appl. No.: 13/176,772

(22) Filed: Jul. 6, 2011

(65) Prior Publication Data
US 2012/0008951 A1   Jan. 12, 2012

(30) Foreign Application Priority Data

Jul. 6, 2010   (JP) .................................. 2010-154137

(51) Int. Cl.
*H04B 10/61*   (2013.01)
*H04L 27/22*   (2006.01)

(52) U.S. Cl.
CPC ............ *H04L 27/223* (2013.01); *H04B 10/613* (2013.01); *H04B 10/614* (2013.01)
USPC ........................................................ 398/205

(58) Field of Classification Search
CPC .................................................. H04B 10/614
USPC .................................................. 398/205, 206
See application file for complete search history.

(56) References Cited

U.S. PATENT DOCUMENTS

| | | | | |
|---|---|---|---|---|
| 4,723,316 | A * | 2/1988 | Glance ........................... | 398/204 |
| 7,298,489 | B2 * | 11/2007 | Dorrer ........................... | 356/450 |
| 8,014,686 | B2 * | 9/2011 | Rahn et al. ..................... | 398/205 |
| 8,204,378 | B1 * | 6/2012 | Marsland, Jr. et al. ......... | 398/65 |
| 2006/0171718 | A1 * | 8/2006 | Hoshida ......................... | 398/152 |
| 2006/0193640 | A1 | 8/2006 | Katagiri et al. | |
| 2006/0222377 | A1 * | 10/2006 | Hoshida et al. ................ | 398/212 |
| 2007/0264029 | A1 * | 11/2007 | Suzuki et al. .................. | 398/188 |
| 2008/0002987 | A1 * | 1/2008 | Tian et al. ...................... | 398/161 |
| 2008/0232816 | A1 * | 9/2008 | Hoshida et al. ................ | 398/152 |

(Continued)

FOREIGN PATENT DOCUMENTS

| | | |
|---|---|---|
| CN | 1815930 | 8/2006 |
| CN | 201491031 U | 5/2010 |
| JP | S63-52530 A | 3/1988 |
| JP | H01-167723 A | 7/1989 |
| JP | 2008-263590 A | 10/2008 |
| WO | WO 2009/031196 A1 | 3/2009 |

OTHER PUBLICATIONS

U.S. Appl. No. 12/985,385, filed Jan. 6, 2011, Mikami et al.

(Continued)

*Primary Examiner* — David Payne
*Assistant Examiner* — Tanya Motsinger
(74) *Attorney, Agent, or Firm* — Antonelli, Terry, Stout & Kraus, LLP.

(57) ABSTRACT

In a free space optical system type demodulator of a phase shift keying signal, if a half beam splitter is used as a non-polarizing optical branching unit that is used when generating beams corresponding to I and Q channels or when multiplexing an interference light, control of a power branching ratio is difficult, and it is necessary to suppress phase shifts that are different depending on a polarization state of an input state, and thereby the demodulator becomes high cost. Moreover, since directions of branched lights are different, it is difficult to suppress a skew of the demodulator. In the present invention, the non-polarizing optical branching unit that is used when generating the beams corresponding to the I and Q channels and when multiplexing the interference light is realized using polarization rotating elements and polarization separating elements. Moreover, branched beams are substantially aligned.

7 Claims, 15 Drawing Sheets

(56) References Cited

U.S. PATENT DOCUMENTS

| | | |
|---|---|---|
| 2008/0267638 A1* | 10/2008 | Nakashima et al. .......... 398/208 |
| 2010/0008679 A1* | 1/2010 | Cole et al. ..................... 398/185 |
| 2010/0189437 A1* | 7/2010 | Hoshida .......................... 398/65 |
| 2010/0221002 A1 | 9/2010 | Ooi et al. |
| 2010/0329667 A1* | 12/2010 | Mikami ............................. 398/9 |
| 2011/0188850 A1* | 8/2011 | Mikami et al. ................. 398/25 |
| 2011/0249976 A1* | 10/2011 | Osawa et al. ................ 398/135 |
| 2012/0294629 A1* | 11/2012 | Zhou ............................ 398/204 |
| 2012/0308227 A1* | 12/2012 | Komaki et al. ................ 398/25 |

OTHER PUBLICATIONS

U.S. Appl. No. 13/072,819, filed Mar. 28, 2011, Osawa et al.

U.S. Appl. No. 13/040,434, filed Mar. 4, 2011, Mikami.

Office Action in corresponding Chinese Application No. 20111019566.3X, dated Jul. 31, 2013, with English translation thereof.

JP Office Action for Japanese Application No. 2010-154137, issued on Jun. 24, 2014.

* cited by examiner

↕ : HORIZONTAL POLARIZATION

⊙ : VERTICAL POLARIZATION

BROKEN LINE: BEFORE MOVEMENT
SOLID LINE: AFTER MOVEMENT

DEMODULATOR AND OPTICAL TRANSCEIVER

CROSS-REFERENCE TO RELATED APPLICATION

The present application claims priority from Japanese patent application JP 2010-154137 filed on Jul. 6, 2010, the content of which is hereby incorporated by reference into this application. This application is related to the applications U.S. Ser. No. 12/985,385 filed Jan. 6, 2011, U.S. Ser. No. 13/040434 filed Mar. 4, 2011 and U.S. Ser. No. 13/072819 filed Mar. 28, 2011.

BACKGROUND OF THE INVENTION

1. Field of the Invention

The present invention relates to a demodulator for demodulating a phase modulation signal in an optical fiber communication system, and an optical transceiver using the same (an optical communication module).

2. Description of the Related Art

In the field of optical communications, a simplest method whereby intensity modulation is performed as signal modulation and light intensity is directly converted to an electric signal using a photodetector as demodulation has long been used. However, in order to support a high bit rate exceeding 40 Gb/s in recent years, a system that performs phase modulation as signal modulation is attracting attention. As demodulation methods of a phase modulation signal, there are the following two ways: a method whereby a light that was signal modulated and transmitted is demodulated by making it interfere with a light from a local oscillator light provided on a receiver side (a coherent method); and a method whereby a light being signal modulated is branched, the branched beams are multiplexed with a timing between them shifted by one bit of signal modulation to cause interference with each other, and the signal is demodulated by converting a shift of phase into a light intensity signal (a differential phase-shift keying method). The differential phase shift keying method is called Differential Binary Phase Shift Keying (DBPSK or DPSK) or Differential Quadrature Phase Shift Keying (DQPSK), etc depending on the number of phases to be modulated. In the coherent method, for example, a case of phase quadrature modulation is called QPSK (Quadrature Phase Shift Keying). Both of the above-mentioned methods can be used with a polarization diversity method for modulating two polarization components of the light independently, and this combination makes it possible to increase information quantity twofold. Especially in the coherent system, a system called DP-QPSK (Dual-Polarization QPSK) that combines the polarization diversity system and QPSK is also being investigated.

The demodulation method in DQPSK will be explained using FIG. 1 that is a block diagram of the demodulator. A modulated light 100 modulated by the differential phase shift keying is first branched into a branched light 102 and a branched light 103 by a branching element 101 like a half beam splitter. The branched light 102 is further two-way branched by a branching element 104, which is configured so that one of these may be added a optical path length of one symbol of signal modulation (for example, when a signal modulation frequency is 20 GHz, about 14 mm) and a light path difference between two branched lights of the branching element 104 may be an integer times of the light wavelength (namely, the phase difference is zero). Then, the two branched lights are again multiplexed with a multiplexing element 106 such as a half beam splitter, and two interference lights are generated. An output signal is acquired by detecting an intensity difference of these interference lights with a differential detector 107 consisting of a balanced photodetector and a trans-impedance amplifier. A channel of the output signal acquired from these interference lights of a phase difference zero is called an I channel. On the other hand, the branched light 103 from the branching element 101 is two-way branched by a branching element 108 similarly with the branched light 102, one of the branched lights being given a delay of one symbol by a delay part 109, and the two branched lights are multiplexed again by a multiplexing element 110 to generate the two interference lights. However, the two branched lights are configured so that the phase difference may become 90-deg. These interference lights are detected by a detector 111 similarly with the I channel and an output signal is obtained. The output channel obtained from the interference light of this 90-deg phase difference is called a Q channel.

FIG. 2 that is a block diagram of the demodulator shows a demodulation method in DP-QPSK. A modulated light 200 (hereinafter referred to as a signal light) is separated into two polarization components by a polarization separating element 201, such as a polarization beam splitter. Similarly, a local oscillator light 202 prepared on a receiving side is also two-way branched by a branching element 203. Here, the branched lights of the signal light and the local oscillator light are inputted to one of optical 90-deg hybrids 204, 205, where the interference light of the signal light and the local oscillator light is generated. At this time, the signal light and the local oscillator light are each branched by an optical branching element inside the optical 90-deg hybrid, and two kinds of multiplexing are performed at a phase relationship where the lights are mutually different in phase by 90-deg. Here, since the two interference lights generated by a single time of multiplexing are detected by any one of the balanced detectors 206, 207, 208, and 209 to output an electric signal corresponding to the intensity difference, output signals of the I channel and the Q channel are generated for one polarization component similarly with the demodulator of DQPSK.

As described above, for the demodulation of the phase modulation signal, an interferometer type optical system for multiplexing multiple lights and making them interfere is used. Moreover, as was described in examples of DQPSK and DP-QPSK, since outputs of two channels are required for demodulation of a quadrature phase modulation signal, two kinds of multiplexing at phase relations mutually different by 90-deg is performed to generate the interference lights. As such a mode for carrying out the invention, there are known Japanese Unexamined Patent Application Publication No. 2008-278249 (corresponding U.S. Ser. No. 12/104,056), Japanese Unexamined Patent Application Publication No. 2006-287493 (corresponding U.S. Ser. No. 11/391,414), Japanese Unexamined Patent Application Publication No. 2007-306371 (corresponding US 2007/0264029), Japanese Unexamined Patent Application Publication No. 2008-17445 (corresponding U.S. Ser. No. 11/479,920), Japanese Patent No. 4170298 (corresponding U.S. Ser. No. 11/117,429), and Japanese Unexamined Patent Application Publication No. 2006-270909 (corresponding U.S. Ser. No. 12/656,413).

As modes of the interferometer for carrying out the invention described above, there are a mode mainly using a planar waveguide circuit and a mode using a free space optical system with bulk optical elements, and the latter is characterized in being low cost compared to the former.

SUMMARY OF THE INVENTION

In order to obtain outputs of the I channel and the Q channel in DQPSK, DP-QPSK, etc., it is necessary to two-way branch the signal light and the local oscillator light (the latter is in the case of a coherent system), respectively. Here, in an existing free space optical system type demodulator, there has been used a non-polarizing beam splitter for two-way branching the light (a half mirror (HM) of Japanese Unexamined Patent Application Publication No. 2008-278249 (corresponding U.S. Ser. No. 12/104,056), Japanese Unexamined Patent Application Publication No. 2006-287493 (corresponding U.S. Ser. No. 11/391,414), Japanese Unexamined Patent Application Publication No. 2007-306371 (corresponding US 2007/0264029), and Japanese Patent No. 4170298 (corresponding U.S. Ser. No. 11/117,429), a beam splitter of Japanese Unexamined Patent Application Publication No. 2008-17445 (corresponding U.S. Ser. No. 11/479,920), and an optical coupler of Japanese Unexamined Patent Application Publication No. 2006-270909 (corresponding U.S. Ser. No. 12/656,413)) regardless of a polarization state of the inputted light. However, the demodulator of Japanese Unexamined Patent Application Publication No. 2006-270909 (corresponding U.S. Ser. No. 12/656,413) is of a guided wave type. Light quantities of the two beams after the branching need to be equalized, and in order to secure performance as a receiver, a branching ratio of the non-polarizing beam splitter is required to be of high accuracy. Furthermore, the demodulator of the phase modulation signal described here is generally used together with a wavelength multiplexing system, and the wavelength of light inputted changes in a predetermined range. Therefore, it is necessary to secure the branching ratio of the above-mentioned high accuracy over a wide wavelength range. Furthermore, generally the non-polarizing beam splitter produces a different phase difference for two different polarization states (horizontal polarization, vertical polarization) to the transmitted light and the reflected light. Because of this property, an error occurs in the phase difference (originally 90-deg) of the I channel and the Q channel. Therefore, it is necessary to suppress the above-mentioned phase difference to zero. A design of such a non-polarizing beam splitter is extremely complicated, and a cost of the splitter becomes high. Incidentally, the non-polarizing beam splitter is used also for the purpose of multiplexing the two beams to generate the interference light. In addition, in this case, similarly with the above, the non-polarizing beam splitter becomes high cost in order to satisfy accuracies of the branching ratio and the phase difference between polarization states that satisfy a performance as the demodulator.

Moreover, as another problem, since optical branching by the non-polarizing beam splitter and the polarization beam splitter accompanies with reflection at a separation plane, the inputted light and the branched lights do not face in the same direction. For this reason, in the existing demodulator, multiple beams of the interference light outputted to the detectors are basically not aligned. On the other hand, in order to simplify an electric circuit, it is desirable that light receiving parts of the detectors are all aligned on the same straight line. As means for leading the interference lights that are not aligned to aligned detectors, although it is possible to use optical fiber as shown in Japanese Patent No. 4170298 (corresponding U.S. Ser. No. 11/117,429), in order to suppress a skew (an optical path length difference) between the output channels, it is necessary to equalize lengths of respective strands of optical fiber with a high accuracy, which gives a problem that the device becomes high cost.

In view of the above-mentioned problem, the first object of the present invention is to provide a low-cost demodulator of a phase shift modulated signal, and further an optical communication module using it.

The second object of the present invention is to provide a low-cost demodulator of a phase shift modulated signal capable of easily suppressing a skew, and further an optical communication module using it.

The following means are used in order to attain the object of the present invention.

(1) The demodulator is configured to have: a polarization converting unit that converts polarization of the signal light in a predetermined polarization state, such as a wavelength plate; a polarization separating unit that separates the polarization-converted signal light into multiple signal lights that interfere at mutually different phase relationships, each separated signal light being in a polarization state mutually orthogonal, such as a beam displacer; a polarization multiplexing unit that multiplexes respective signal lights separated by the polarization separating unit with another separated signal light or local oscillator light; and an interference light generating unit that generates multiple interference lights by converting and separating polarization of the multiplexed beams generated by the polarization multiplexing unit.

Thereby, optical powers when multiple signal lights that interfere at mutually different relationships are generated or when multiple interference lights are generated can be equally set with high accuracy. Moreover, since the phase difference that depends on the polarization state does not occur at the time of generation of the signal light, it is easily realizable to suppress an error of a difference between phase relationships when the signal lights interfere, and as a result lower cost of the device becomes possible.

(2) In (1), the demodulator is configured so that the signal light separated by the polarization separating unit may be substantially parallel to the signal inputted to the polarization converting unit. This configuration enables separated light beams to be outputted being aligned, which can simplify the optical system and suppress the skew.

(3) In (2), the demodulator is configured so that the polarization separating unit shall be a beam displacer. Thereby, since the separated beams can easily be aligned, tit is possible to perform the simplification of the optical system and the suppression of the skew simply.

(4) In (2), the demodulator is configured so that the polarization separating unit shall be a polarization beam splitter disposed so as to make parallel the incoming beam and the outgoing beam. Thereby, it is possible to finely adjust a distance between the separated beams, and also possible to generate the interference light with high accuracy.

(5) In (1), the demodulator is configured to have second polarization separating unit that separates two polarization states of the signal light of a random polarization state on a light source side of the polarization converting unit. Thereby, it is possible to attain the effect of (1) regardless of the polarization state of the inputted signal light.

(6) In (5), the demodulator is configured to provide second polarization multiplexing unit that multiplexes each of the interference lights depending on its polarization state on a detector side of the interference light generating unit. This configuration avoids the necessity of providing a detector for each polarization state of the inputted signal light, and therefore, it becomes possible to demodulate a signal from the signal light in a random polarization state with a simple configuration.

(7) The demodulator is configured to have: a polarization converting unit that converts polarizations of the signal light in a predetermined polarization state and the local oscillator light; a single polarization separating unit that separates the two polarization states of the signal light and the local oscillator light that were polarization-converted; polarization multiplexing unit that multiplexes the respective signal lights and local oscillator lights that were separated by the polarization separating unit; and an interference light generating unit that generates interference lights by converting and separating polarization of the multiplexed beams generated by the polarization multiplexing unit. Thereby, it becomes possible to multiplex the signal light and the local oscillator light with high accuracy and becomes possible to generate a high quality demodulated signal.

(8) The demodulator is configured to comprise: an interference optical system for generating multiple interference beams by making the local oscillator light interfere with each of the two polarization components of the signal light; multiple reflecting elements each for reflecting each of the interference beams; and multiple detectors for detecting the interference beams reflected from the reflecting elements with their light receiving parts aligned on one straight line; wherein the optical path lengths until the signal lights reach the reflecting elements are substantially all equal, and the interference beams reflected from the reflecting elements are substantially aligned and enter the detectors. Thereby, it becomes possible to realize a demodulator capable of easily suppressing the skew.

According to the present invention, it is possible to provide the demodulator of a phase modulation signal that is low cost compared to the existing ones or whose skew is small.

BRIEF DESCRIPTION OF THE DRAWINGS

FIG. 6A and FIG. 6B are diagrams for explaining actions in the polarization beam splitter, in which FIG. 6A shows the existing action in the polarization beam splitter and FIG. 6B shows the action in the polarization beam splitter of the embodiment;

DETAILED DESCRIPTION OF THE INVENTION

First Embodiment

Figure 1:
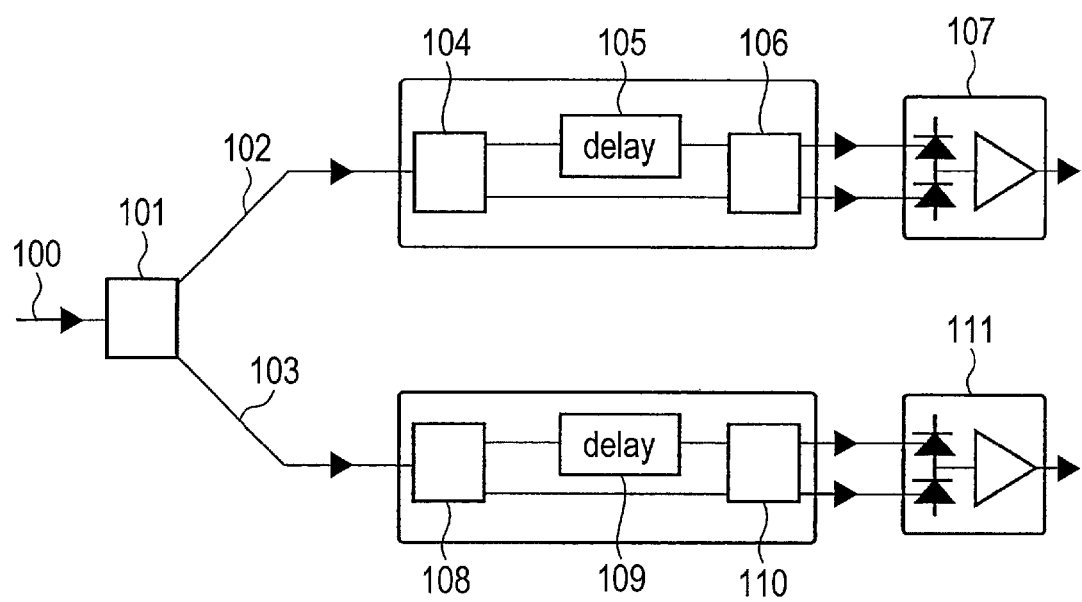
FIG. 1 is a block diagram of a DQPSK signal demodulator.
Figure 2:
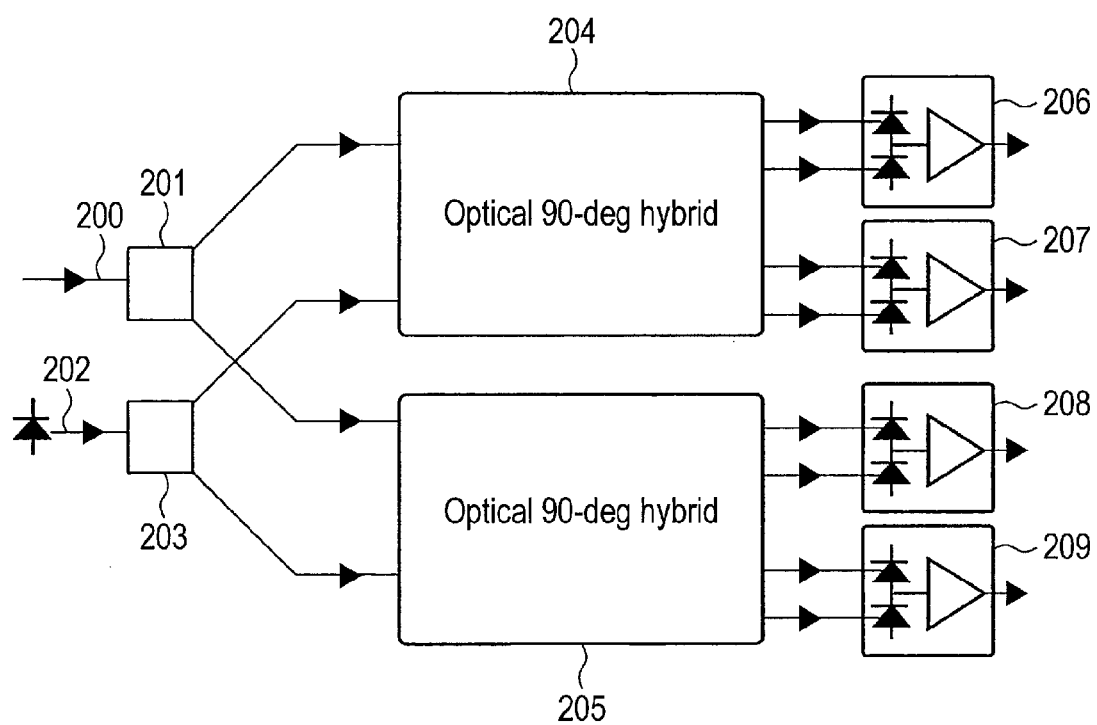
FIG. 2 is a block diagram of a DP-QPSK signal demodulator.
Figure 3:
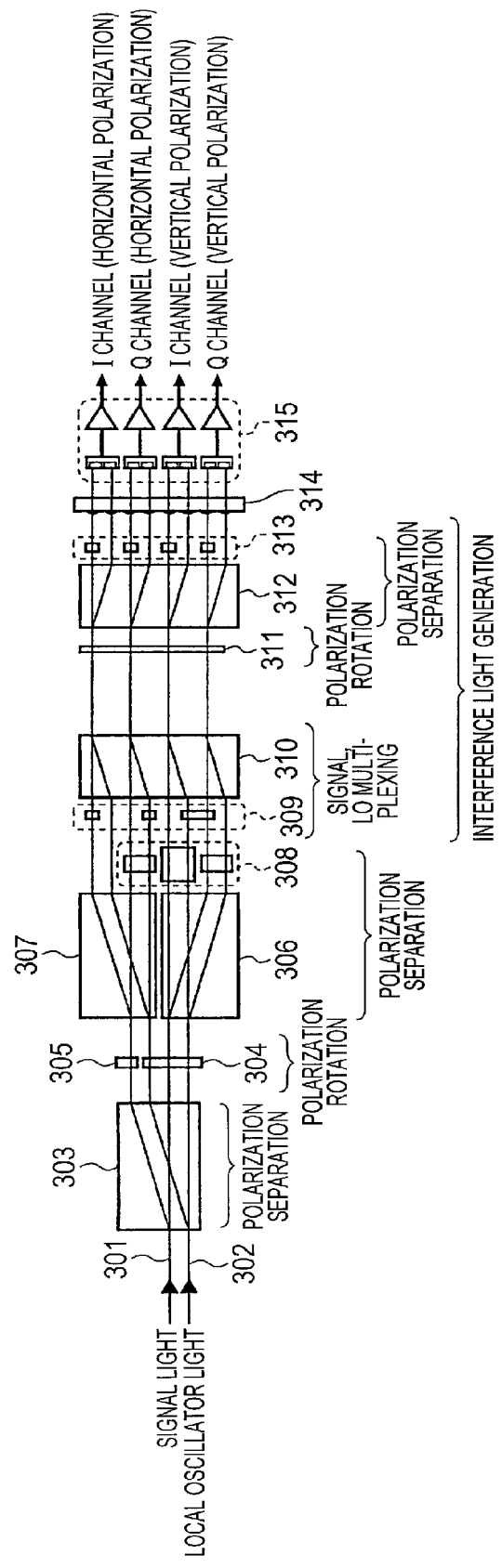
FIG. 3 is a configuration diagram of a DP-QPSK signal demodulator of the present invention.

FIG. 3 shows a DP-QPSK signal demodulator of the present invention. Since DP-QPSK is one kind of coherent system, a signal light 301 subjected to quadrature phase modulation and a local oscillator light 302 prepared on a receiving side are inputted to it. First, the signal light 301 and the local oscillator light 302 are each separated into polarization components by a beam displacer 303. The beam displacer is an optical element obtained by cutting a birefringent medium, and has a characteristic of separating an incident light into two polarization components mutually orthogonal. Moreover, it has a characteristic of emitting the separated two lights in parallel to an incoming light. Here, the local oscillator light 302 has been in a 45-deg polarization state in advance in which the vertical polarization (a polarization component emitted without an accompanying displacement of an optical axis position in the beam displacer) and the horizontal polarization (a polarization component emitted with an accompanying displacement of the optical axis position in the beam displacer) have an equal magnitude, so that the light quantities of the two beams branched by the beam displacer 303 have become equal.

Among four beams generated after passing through the beam displacer 303, a vertical polarization component of the signal light 301 and a vertical polarization component and a horizontal polarization component of the local oscillator light 302 pass through a half-wave plate 304 whose axial direction is set to 22.5-deg with respect to a horizontal polarization direction and assumes a 45-deg polarization state, while the horizontal polarization component of the signal light passes through a quarter-wave plate 305 whose axial direction is set to 45-deg with respect to the horizontal polarization direction and assumes a circular polarization state. The circular polarization state contains equal quantities of the horizontal polarization component and the vertical polarization component similarly with a 45-deg polarization state, but a phase difference between the horizontal polarization component and the vertical polarization component is 90-deg (in the case of the 45-deg polarization state, it is 0-deg). This phase difference of 90-deg becomes a relative phase difference of the signal light and the local oscillator light between the I channel and the Q channel of the output that will be described later. These four beams are each two-way branched by a beam displacer 306 or beam displacer 307, respectively, generating total eight beams. These beams pass through glass plates 308 of predetermined thicknesses, respectively, for skew correction. Then, four of the eight beams pass through half-wave plates 309 whose axial direction is set to 45-deg with respect to the horizontal polarization direction, resulting in polarization rotation of 90-deg, and at this time point, the signal lights are all converted to the vertical polarization and the local oscillator lights are all converted to the horizontal polarization. Here, these eight beams enter a beam displacer 310, the four beams of the local oscillator light produce respective displacements because of being the horizontal polarization, and these are multiplexed with the four beams of the signal light, respectively. These four multiplexed beams pass through a half-wave plate 311 whose axial direction is set to 22.5-deg with respect to the horizontal polarization direction, and the signal light component and the local oscillator light component of each multiplexed beam become +45-deg polarization and −45-deg polarization, respectively. After that, the four multiplexed beams are each separated into the horizontal polarization component and the vertical polarization component by a beam displacer 312, and at this time point, eight interference lights of the signal light and the local oscillator light are generated. Some parts of these beams pass through glass plates 313 for the skew correction. Finally, each of the eight beams enters an array lens 314, is focused, and is detected by a detector 315. Among these eight beams, an intensity difference of the two adjacent beams become a desired interference signal, and finally there are obtained outputs of the I channel and the Q channel that are interference signal outputs with phases mutually different by 90-deg for each of the horizontal polarization component and the vertical polarization component of the signal light.

Here, that a high branching ratio is realizable in this embodiment will be explained. In this embodiment, beam separation was performed based on polarization separation by the beam displacer. Therefore, the branching ratio at the time of this separation (an intensity ratio of the two branched beams) was decided by a ratio of the horizontal polarization component and the vertical polarization component of the incoming light. Therefore, provided that the axial directions of the wavelength plates 304, 305, 309, and 311 arranged immediately before the beam displacers have taken desired values, it is possible to realize a branching ratio of 1:1 regardless of a manufacture accuracy and a variation of the beam displacers and the wavelength plates. Since the axial directions of the wavelength plates 304, 305, 309, and 311 are adjustable, respectively, a branching ratio of 1:1 can be realized by adjustment with extremely high accuracy. Especially, the beam separation by the wavelength plates 304, 305 and the beam displacers 306, 307 is at a position where the I channel and the Q channel are generated, and it is possible to equalize an intensity ratio of the I channel and the Q channel with considerably high accuracy compared to an existing scheme.

Moreover, since the polarization separating element like the beam splitter of this embodiment basically separates the horizontal polarization component and the vertical polarization component into separate beams, a phase difference between the horizontal polarization component and the vertical polarization component of the light after the branching that appears in a non-polarizing beam splitter is not generated principally. Therefore, a phase difference deviation between the channels originating from the beam separation does not occur at the time of branching the I and Q channels. Similarly, since the phase difference deviation does not occur at positions of multiplexing the signal light and the local oscillator light and of generating the interference light, as a consequence of this, it is possible to suppress the phase difference deviation (shift from 90-deg) between the I channel output and the Q channel output as the demodulator.

In addition, a role of the glass plates 308, 313 will be explained. Although the beam emitted with an accompanying displacement by the beam displacer and the beam emitted without an accompanying displacement are emitted in parallel, the two beams are emitted through different optical path lengths because the refractive indices inside the beam displacer are different. Since this optical path length difference appears as a skew (a timing difference between ports of a modulated signal) in the receiver of the modulated signal and the skew is directly connected with performance degradation as a receiver, the outgoing beam emitted through a relatively short optical path length and without an accompanying displacement is made to pass through a glass plate, so that its optical path length is made to be equal to that of the other beam. However, in the case where a generation rate of the skew in the beam displacer is sufficiently small and negligible, these glass plates can be omitted.

Figure 4:
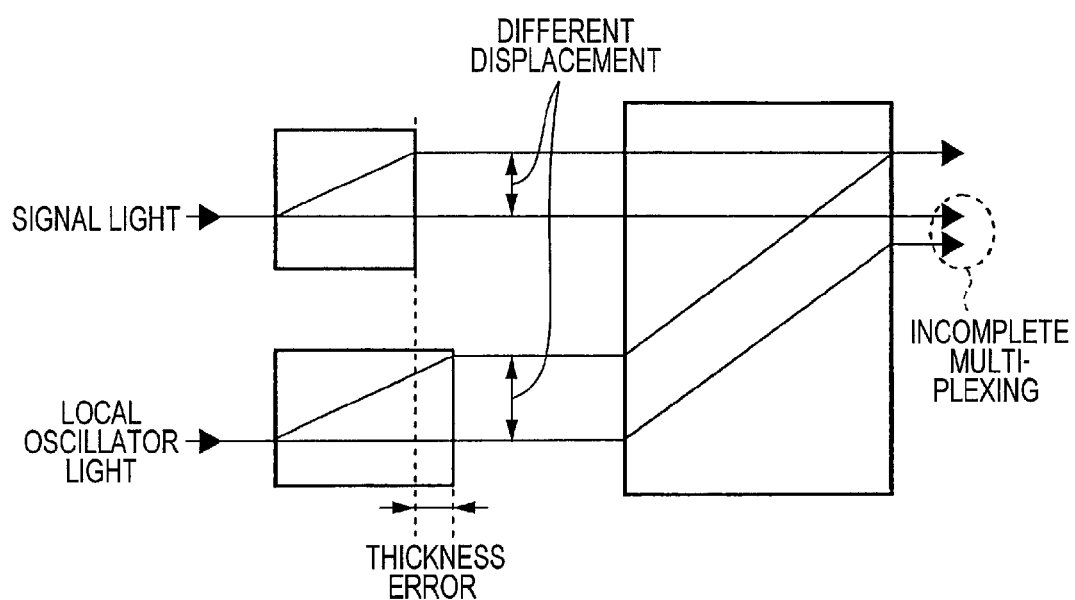
FIG. 4 is a diagram for explaining that multiplexing becomes incomplete due to a thickness error of a beam displacer.

In this embodiment, the signal light and the local oscillator light pass through the same beam displacer fundamentally. This is not only for reducing the number of beam displacers, but also for producing an effect of not yielding a difference in beam separation distance resulting from a thickness dispersion of the beam displacer. For example, consider a case where after separating the signal light and the local oscillator light with different beam displacers, respectively, they are multiplexed by other beam displacers, as shown in FIG. 4. In this case, if a thickness error arises between the beam displacer for separating the signal light and the beam displacer for separating the local oscillator light, displacements when the signal light and the local oscillator light are separated will differ. Accordingly, when multiplexing these with another beam displacer, two pairs of beams cannot be multiplexed correctly because of the difference in displacement, which degrades a generation efficiency of the interference light and leads to performance degradation of the receiver. Against this phenomenon, by multiplexing the signal light and the local oscillator light with the same beam displacer, it is possible to avoid the performance degradation of the receiver due to such a thickness error.

Second Embodiment

Figure 5:
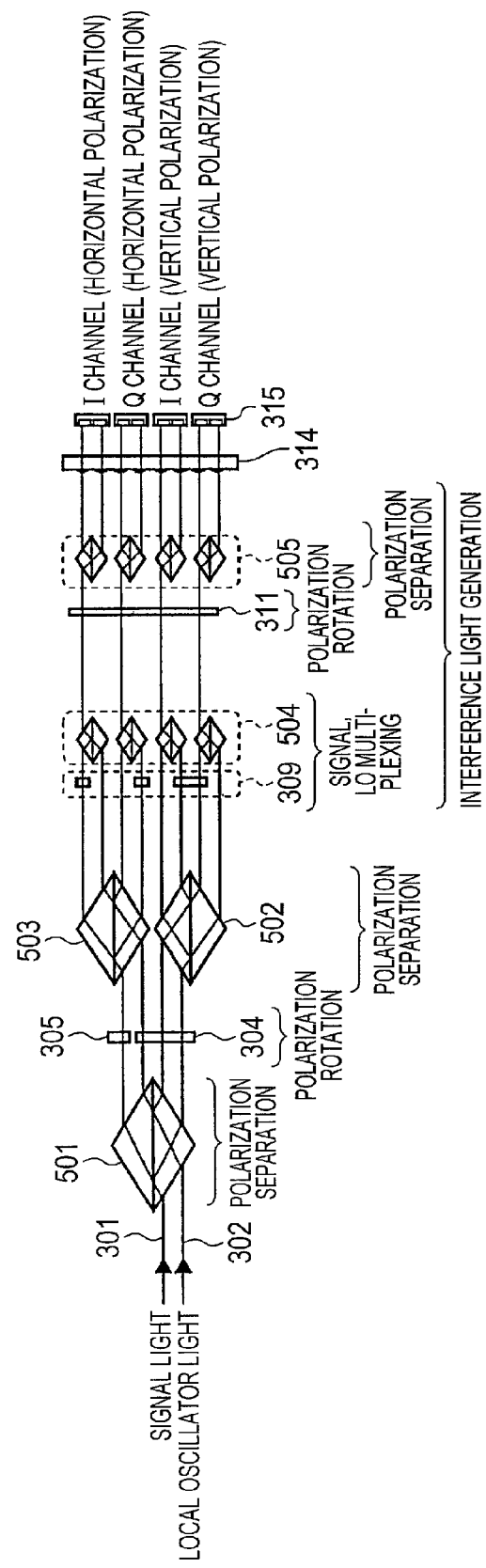
FIG. 5 is a configuration diagram of a DP-QPSK signal demodulator using polarization beam splitters.
Figure 6A:
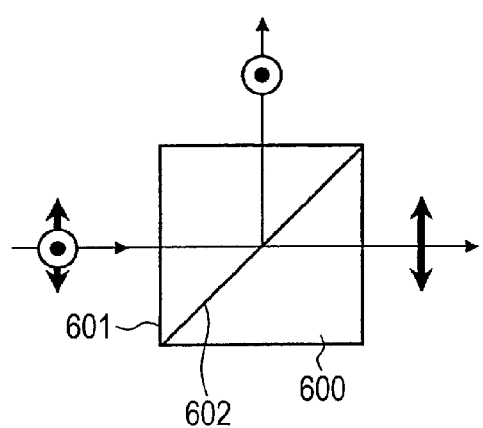
Figure 6B:
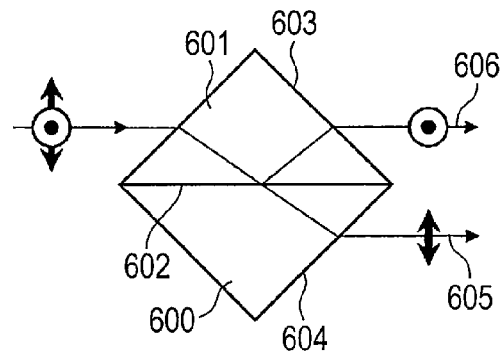
Figure 7:
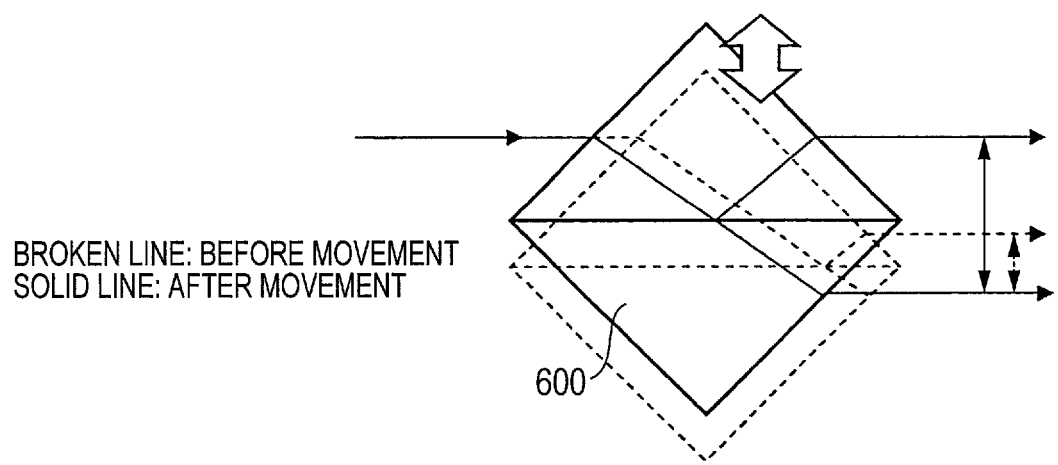
FIG. 7 is a diagram for explaining that a distance between separated beams is adjustable by displacement of the polarization beam splitter.

This embodiment is another embodiment in which the beam displacer in the first embodiment is replaced with a polarization beam splitter. FIG. 5 shows a configuration diagram of this embodiment. As shown in FIG. 6A, generally in the polarization beam splitter, a beam is made to enter an entrance plane 601 almost perpendicularly thereto, the horizontal polarization component of the incoming beam is transmitted in a separation plane 602, and the vertical polarization component is reflected to a 90-deg direction. On the other hand, in this embodiment, as shown in FIG. 6B, the incident angle to the polarization beam splitter is changed, the demodulator is configured so that a transmitted light 605 and a reflected light 606 at the separation plane may be emitted in parallel to an incoming light 607 using a fact that the beams are refracted at the entrance plane 601 and exit planes 603, 604 and change their directions. Therefore, the polarization beam splitter can be treated in exactly the same way as the beam displacer of the first embodiment. However, on the contrary to a fact that the distance between the separated beams in the beam displacer is governed by an outer shape and an optical axis direction of the beam displacer, in the polarization beam splitter of this embodiment, a reflected beam position can be made variable by moving the polarization beam splitter to a direction perpendicular to the incoming beam as shown in FIG. 7, and so that fine adjustment of a distance between the transmitted beam and the reflected beam is possible.

Third Embodiment

Figure 8:
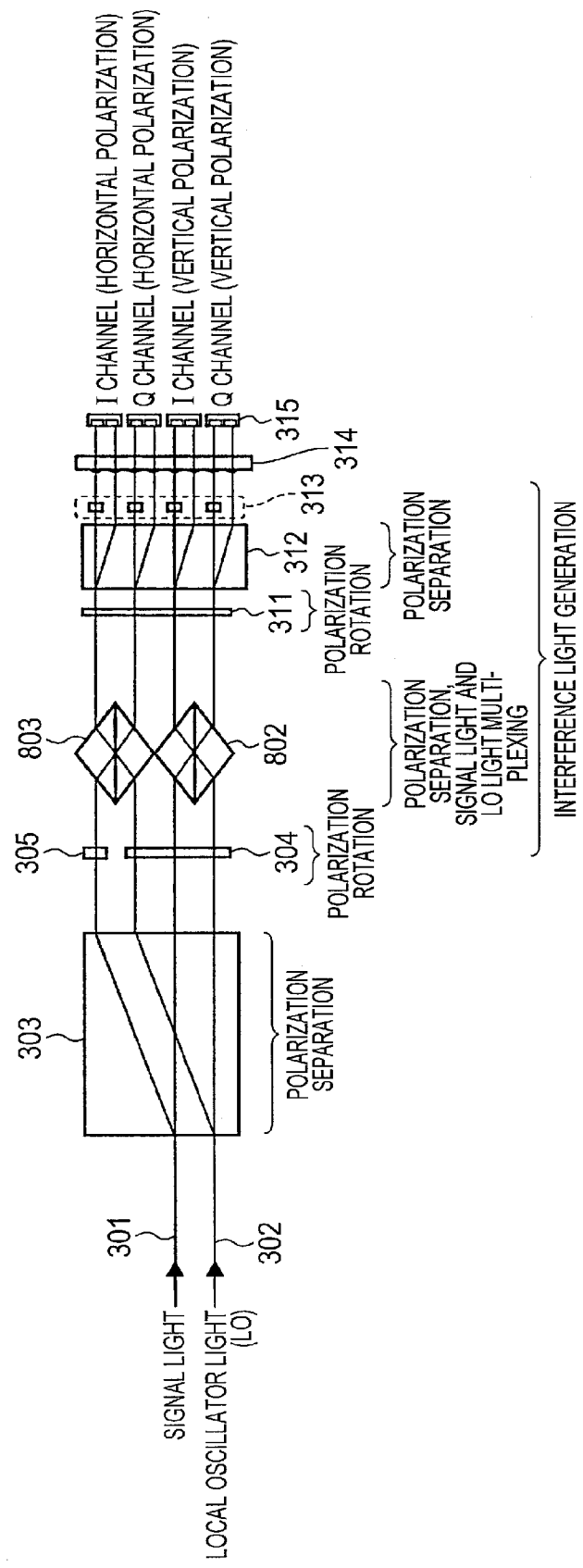
FIG. 8 is a configuration diagram of an embodiment of the invention where polarization separation and multiplexing of a signal light and a local oscillator light are performed by the same polarization beam splitter in a DP-QPSK signal demodulator.
Figure 9:
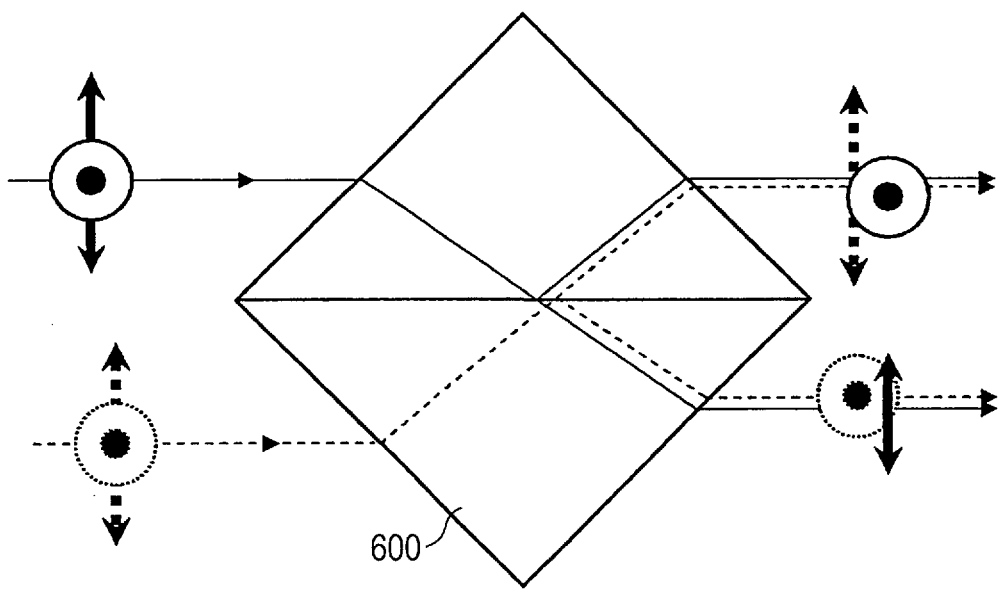
FIG. 9 is a diagram for explaining that the polarization separation and the multiplexing are performed simultaneously by the polarization beam splitter.

This embodiment is another embodiment in which the polarization separation for generating the I and Q channels and the polarization multiplexing for generating the interference lights in the first and second embodiments are performed simultaneously. FIG. 8 shows its configuration diagram. Similarly with the first embodiment, the signal light and the local oscillator light whose polarizations were separated by the beam displacer 303 and whose polarizations were converted by the half-wave plate 304 or the quarter-wave plate 305 are inputted to either of polarization beam splitters 802, 803. Here, although the polarization beam splitters 802, 803 separate the horizontal polarization component and the vertical polarization component of each of the signal light and the local oscillator light, as shown in FIG. 9, the horizontal polarization component of the signal light and the vertical polarization component of the local oscillator light are multiplexed to be on the same axis, and the vertical polarization component of the signal light and the horizontal polarization component of the local oscillator light are multiplexed to be on the same axis. That is, the polarization conversion made by the beam displacers 306, 307 and the multiplexing of the signal light and the local oscillator light made by the beam displacer 310 in the first embodiment are made by the polarization beam splitters 802, 803 simultaneously. The four beams emitted from the polarization beam splitters 802, 803 are the same as the four beams emitted from the beam displacer 310 in the first embodiment, and a process until these beams are detected is the same as that of the first embodiment.

Figure 10:
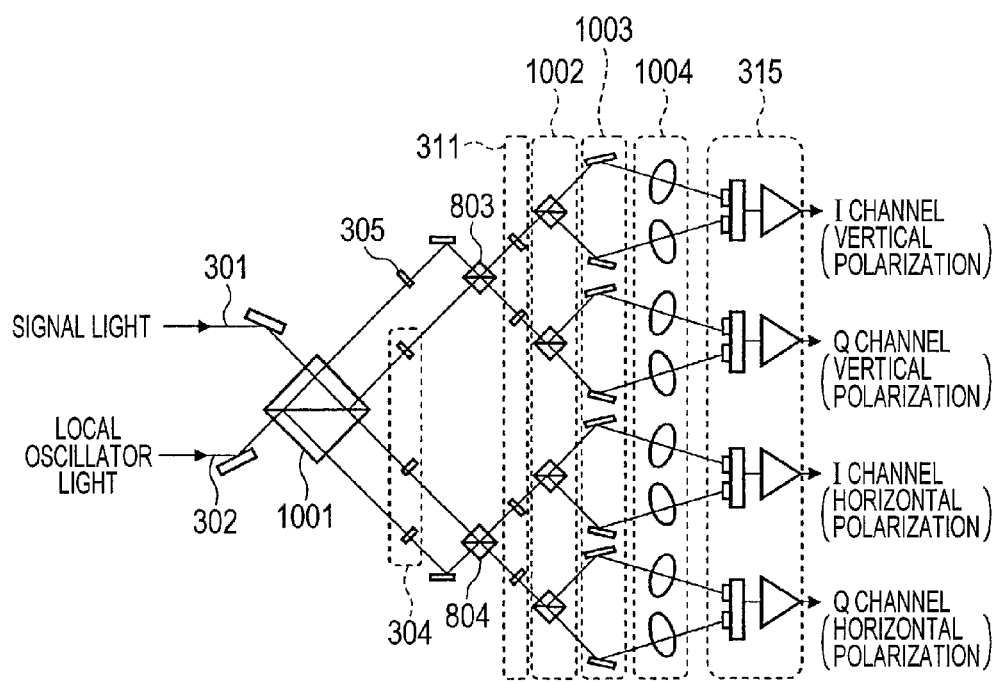
FIG. 10 is a configuration diagram of a mode for carrying out the invention that uses the polarization separation and the multiplexing by the polarization beam splitter.

Incidentally, as shown in FIG. 10, as the polarization separating element, a configuration using only beam splitters (the incoming direction of the beam is as shown in FIG. 6A, and the transmitted light and the reflected light face in respective directions forming an angle of 90-deg) is also possible.

Fourth Embodiment

Figure 11:
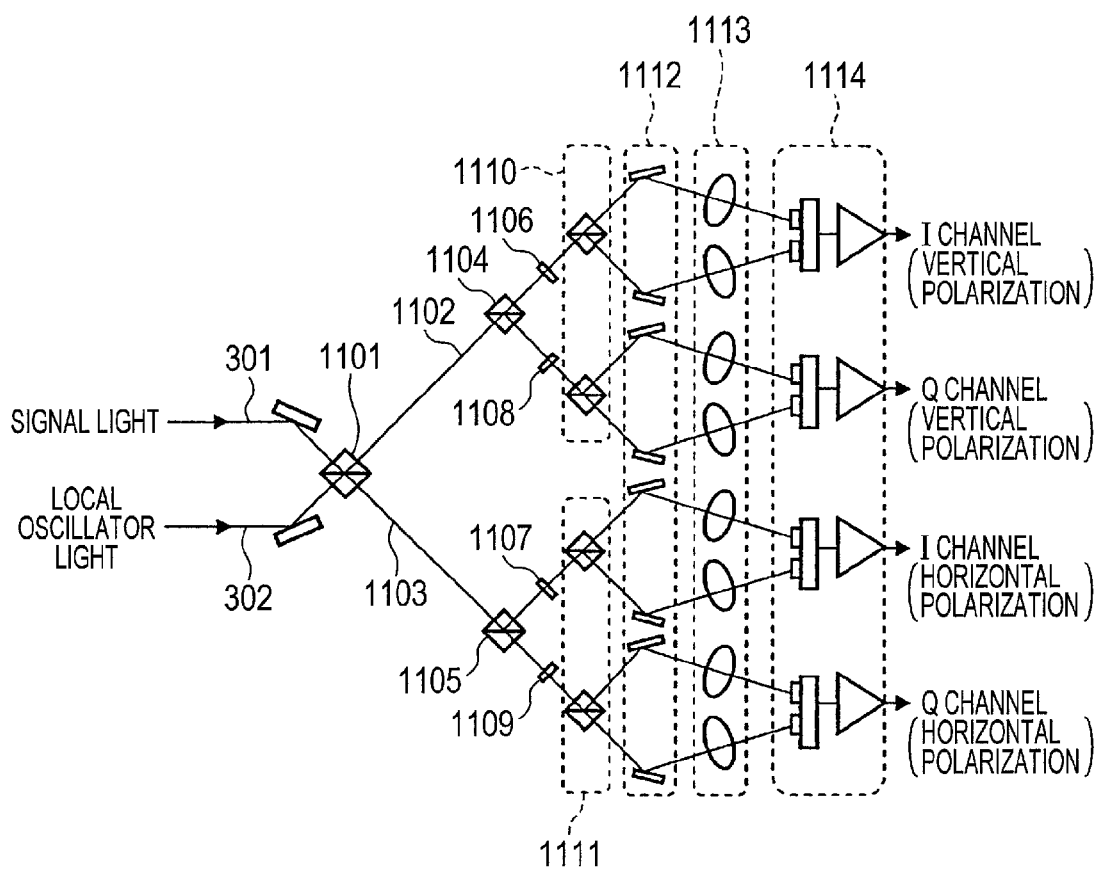
FIG. 11 is a configuration diagram of a mode for carrying out the invention where a skew is suppressed.

This embodiment is another embodiment in which the skew of the DP-QPSK signal demodulator of the present invention is suppressed. FIG. 11 shows a configuration diagram of this embodiment. The inputted signal light together with the local oscillator light enters a polarization beam splitter 1101, which generates a first multiplexed beam 1102 in which the vertical polarization component of the signal light and the horizontal polarization component of the local oscillator light are multiplexed and a second multiplexed beam 1103 in which the horizontal polarization component of the signal light and the vertical polarization component of the local oscillator light are multiplexed. The first multiplexed beam 1102 enters a non-polarizing beam splitter 1104, and is branched into a first branched beam that is a transmitted light and a second branched beam that is a reflected light. Similarly, the second multiplexed beam enters a non-polarizing beam splitter 1105, and is branched into a third branched beam that is a reflected light and a fourth branched beam that is a transmitted light. The first and third branched beams pass through half-wave plates 1106, 1107 (axial direction: 22.5-deg to the horizontal polarization direction), respectively, and the second and fourth branched beams pass through quarter-wave plates 1108, 1109 (axial direction: 45-deg to the horizontal polarization direction), respectively, and each pair of the beams are made to be in a polarization state in which the signal light and the local oscillator light have equal quantities of the horizontal polarization component and the vertical polarization component. These branched beams are separated into the horizontal polarization component and the vertical polarization component by a polarization beam splitter 1110 or 1111 to generate the interference lights. The transmitted light and the reflected light from each polarization beam splitter are reflected by a mirror 1112, respectively, are focused by a lens 1113, and enter the light receiving parts adjacent to detectors 1114 to generate signals corresponding to the intensity differences of these. The output signals generated from the first and second branched lights are the I channel output signal and the Q channel output signal corresponding to the vertical polarization component of the signal light, respectively, and the output signals generated from the third and fourth branched lights are the I channel output signal and the Q channel output signal corresponding to the horizontal polarization component of the signal light, respectively.

Incidentally, in this configuration, the non-polarizing beam splitters 1104, 1105 are arranged at an equal distance from the polarization beam splitter 1101 and so that all of distances between the polarization beam splitters 1110 and the non-polarizing beam splitter 1104 and distances between the polarization beam splitters 1111 and the non-polarizing beam splitter 1105 may be equal. Furthermore, the reflected lights and the transmitted lights that are generated from the respective polarization beam splitters 1110, 1111 enter the detectors being almost aligned. That is, the optical axes are symmetrical to a central axis of the detector for detecting these beams, and these beams are emitted in a direction that approaches to the detector. Thus, because of the configuration having symmetry, optical path lengths of the respective interference lights until they reach the mirrors 1112 from the multiplexing time at the polarization beam splitter 1101 are equal. Furthermore, since the beams reflected from the mirrors 1112 substantially align and enter the detectors 1114, optical path lengths of the respective beams until they reach the detectors 1114 from a time point of reflection at the mirror 1112 become equal, and as a result, optical path lengths of the respective interference lights until they reach the detectors 1114 from a time point of multiplexing at the polarization beam splitter 1101 become equal. That is, the skew does not occur. Furthermore, even when a skew occurs in the beam before reaching the mirrors 1112 due to mounting position shifts of the polarization beam splitters 1101, 1110, and 1111 and the non-polarizing beam splitters 1104, 1105, and the like, by finely adjusting a position and an angle of each of the mirror 1112, it is possible to finely adjust the optical path length from the mirror 1112 to the detector 1114 and to correct the skew; therefore, suppression of the skew is easy.

Fifth Embodiment

Figure 12:
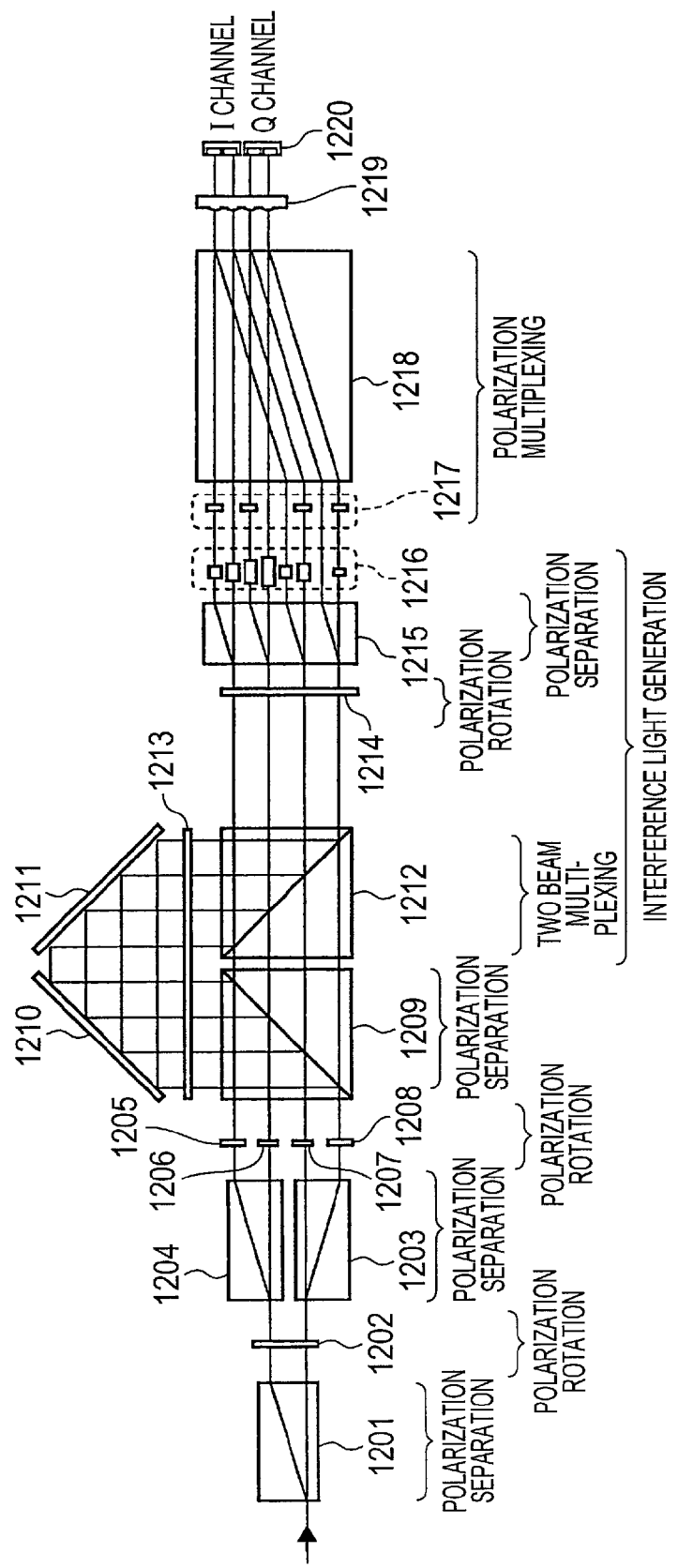
FIG. 12 is a configuration diagram of a DQPSK signal demodulator of the present invention.

This embodiment is a mode that carries out a DQPSK signal demodulator of the present invention. FIG. 12 shows its configuration diagram. The inputted signal light of a random polarization state is separated into the horizontal polarization component and the vertical polarization component by a beam displacer 1201 similarly with the first embodiment. After the separated beams were made to be in a polarization state in which each of them has equal quantities of the horizontal polarization component and the vertical polarization component by a half-wave plate 1202 (axial direction: 22.5-deg to the horizontal polarization direction), Either of beam displacers 1203, 1204 separates the horizontal polarization component and the vertical polarization component as separate beams, and the beams corresponding to the I and Q channels are generated. These beams are made to be in polarization states each of which has equal quantities of the horizontal polarization component and the vertical polarization component by any one of a half-wave plate 1205 (axial direction: 22.5-deg to the horizontal polarization direction), a quarter-wave plate 1206 (axial direction: 45-deg to the horizontal polarization direction), a half-wave plate 1207 (axial direction: 67.5° to the horizontal polarization direction), and a quarter-wave plate 1208 (axial direction: 135-deg to the horizontal polarization direction), and subsequently the polarization beam splitter 1209 separates each of them into the horizontal polarization component being transmitted and the vertical polarization component being reflected. Among these, the reflected beam enters the polarization beam splitter 1212 with a delay of one symbol of the signal light to the transmitted light given by its optical path being folded by mirrors 1210, 1211, and is multiplexed with the transmitted light in it. These multiplexed beams correspond to the multiplexed beams in the first embodiment in which the signal light and the local oscillator light are multiplexed. By making them pass through a half-wave plate 1214 (axial direction: 22.5-deg to the horizontal polarization direction) and a beam displacer 1215, the interference lights are generated similarly with the first embodiment. The interference light in this embodiment is an interference light of the transmitted beam and the reflected beam in the polarization beam splitter 1209. These interference lights are subjected to the skew correction by glass plates 1216 similarly with similarly with the first embodiment, and some parts of the beams pass through a half-wave plate 1217 (axial direction: 45-deg to the horizontal polarization direction). At this time point, the interference light originating from the beam of the horizontal polarization component separated by the beam displacer 1201 becomes the vertical polarization and the interference light originating from the beam of the vertical polarization component becomes the vertical polarization. Then, these of the interference lights of the horizontal polarization and the interference lights of the vertical polarization are multiplexed by a beam displacer 1218, are focused onto detectors 1220 by an array lens 1219, and are detected.

Incidentally, a silicon monocrystal 1213 is inserted in an optical path of the beam reflected by the polarization beam splitter 1209. This is because an unillustrated heating element makes temperature variable, and a phase of the reflected beam (to the transmitted beam of the polarization beam splitter 1208) is adjusted by means of refractive index variation by temperature. This phase is adjusted so as to be zero in the I channel. Here, it is adjusted so that the phase in the Q channel may become 90-deg to the above-mentioned phase in the I channel by the half-wave plates 1205, 1207 and the quarter-wave plates 1206, 1208: the phase in the Q channel will be 90-deg inevitably by setting the phase in the I channel as 0-deg. Moreover, although there are every two beams corresponding to the I channel and the Q channel, phases of the two beams corresponding to the same channel are set to be equal by the half-wave plates 1205, 1207 and the quarter-wave plates 1206, 1208.

In this embodiment, for the beam separation, polarization separating elements, such as a beam displacer and a polarization beam splitter, are basically used. Since the beam displacer 1201 separates the inputted signal light into two beams of predetermined polarization states even when the polarization state of the inputted signal light is random, this enables subsequent branching of the beam by the polarization separating unit to be performed with high accuracy regardless of the polarization state of the inputted signal light.

Moreover, the beam displacer 1218 is inserted in order to multiplex again the horizontal polarization component and the vertical polarization component of the signal that are branched by the beam displacer 1201. This is because the phase modulation of the signal light is different from DP-QPSK, not being polarization multiplexed, and it is desirable that the output of the demodulator is an output that does not depends on the polarization state of the inputted signal light. On the contrary, when the polarization-multiplexed DQPSK signal is demodulated, what is necessary is just to remove the half-wave plate 1217 and the beam displacer 1218 and to configure the demodulator to output signals of the I channel and the Q channel for each of the polarization components by detecting the eight interference beams similarly with the embodiment.

Sixth Embodiment

Figure 13:
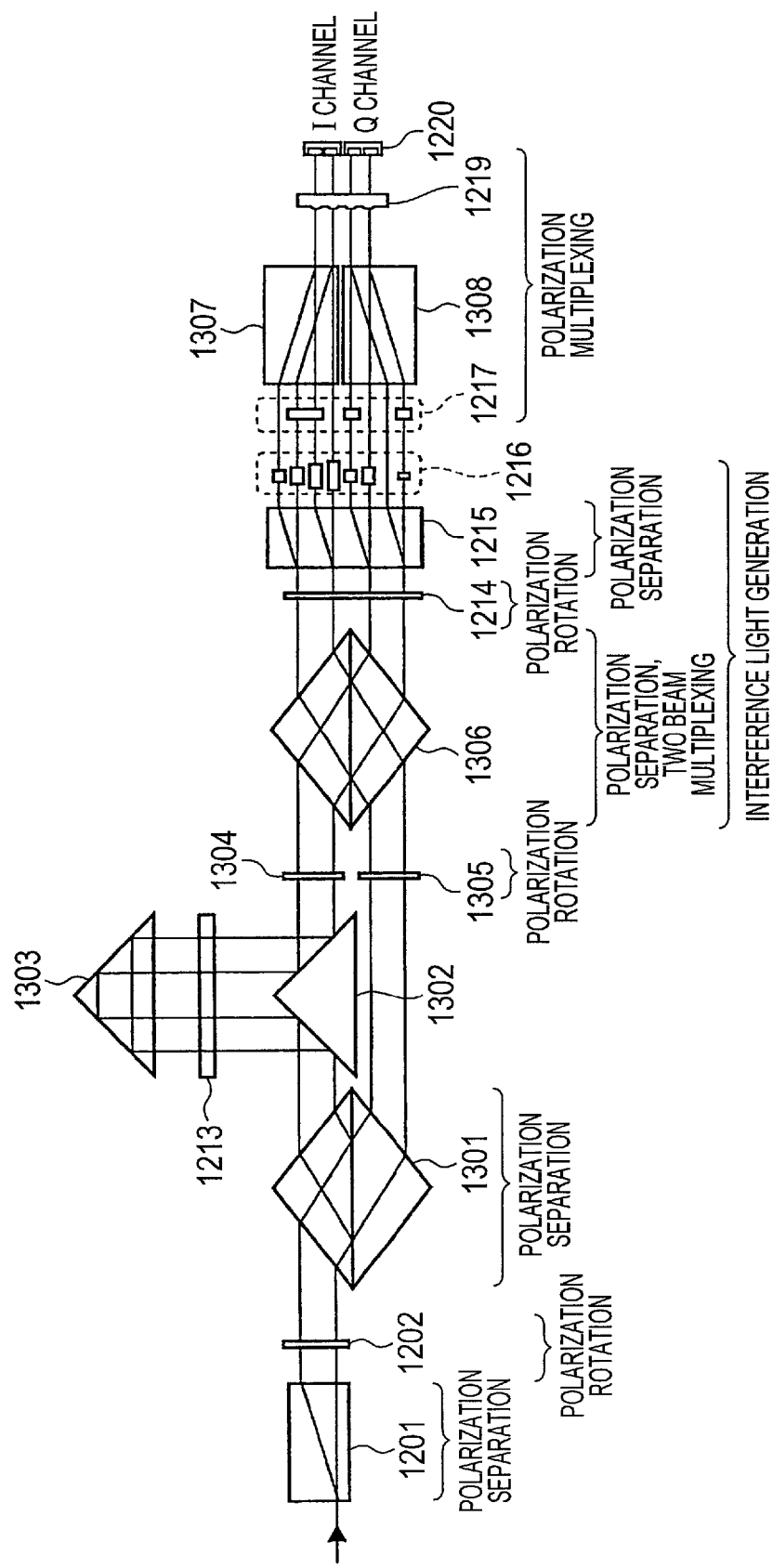
FIG. 13 is a configuration diagram of a mode for carrying out the invention where the polarization separation and the multiplexing of two beams are performed by the same polarization beam splitter in a DQPSK signal demodulator.

This embodiment is another embodiment in which the polarization separation of the polarization beam splitter 1209 in the fifth embodiment and the two-beam multiplexing of a polarization beam splitter 1212 are performed simultaneously. FIG. 13 shows a configuration diagram of this embodiment. In the case of this embodiment, beams corresponding to the I channel and the Q channel for the horizontal polarization component and the vertical polarization component of the signal light inputted by a polarization beam splitter 1301, respectively, instead of the beam splitters 1203, 1204 of the fourth embodiment are generated. After the reflected beam (the vertical polarization component) at the polarization beam splitter 1301 is subjected to optical path change by prism mirrors 1302, 1303 and is given a delay of one symbol of signal modulation, it passes through a half-wave plate 1304 (axial direction: 22.5-deg to the horizontal polarization direction), and assumes a polarization state in which the horizontal polarization component and the vertical polarization component are equally contained. Similarly, the transmitted beam (the horizontal polarization component) at the polarization beam splitter 1302 passes through a quarter-wave plate 1305 (axial direction: 45-deg to the horizontal polarization direction), and assumes a polarization state in which the horizontal polarization component and the vertical polarization component are equally contained (however, a phase difference of 90-deg occurs between the horizontal polarization component and the vertical polarization component). Therefore, these beams are each separated into the horizontal polarization component and the vertical polarization component by a polarization beam splitter 1306, as shown in FIG. 10, similarly with the third embodiment, and are multiplexed with different beams. The four beams generated here are equivalent to the multiplexed beams generated by the polarization beam splitter in the fourth embodiment, and a processes after this is the same as that of the fourth embodiment (however, it is noted that the multiplexing of the interference lights based on the horizontal polarization component and the vertical polarization component of the inputted signal light uses separate beam displacers 1307, 1308 for the I and Q channels, respectively).

Seventh Embodiment

Figure 14:
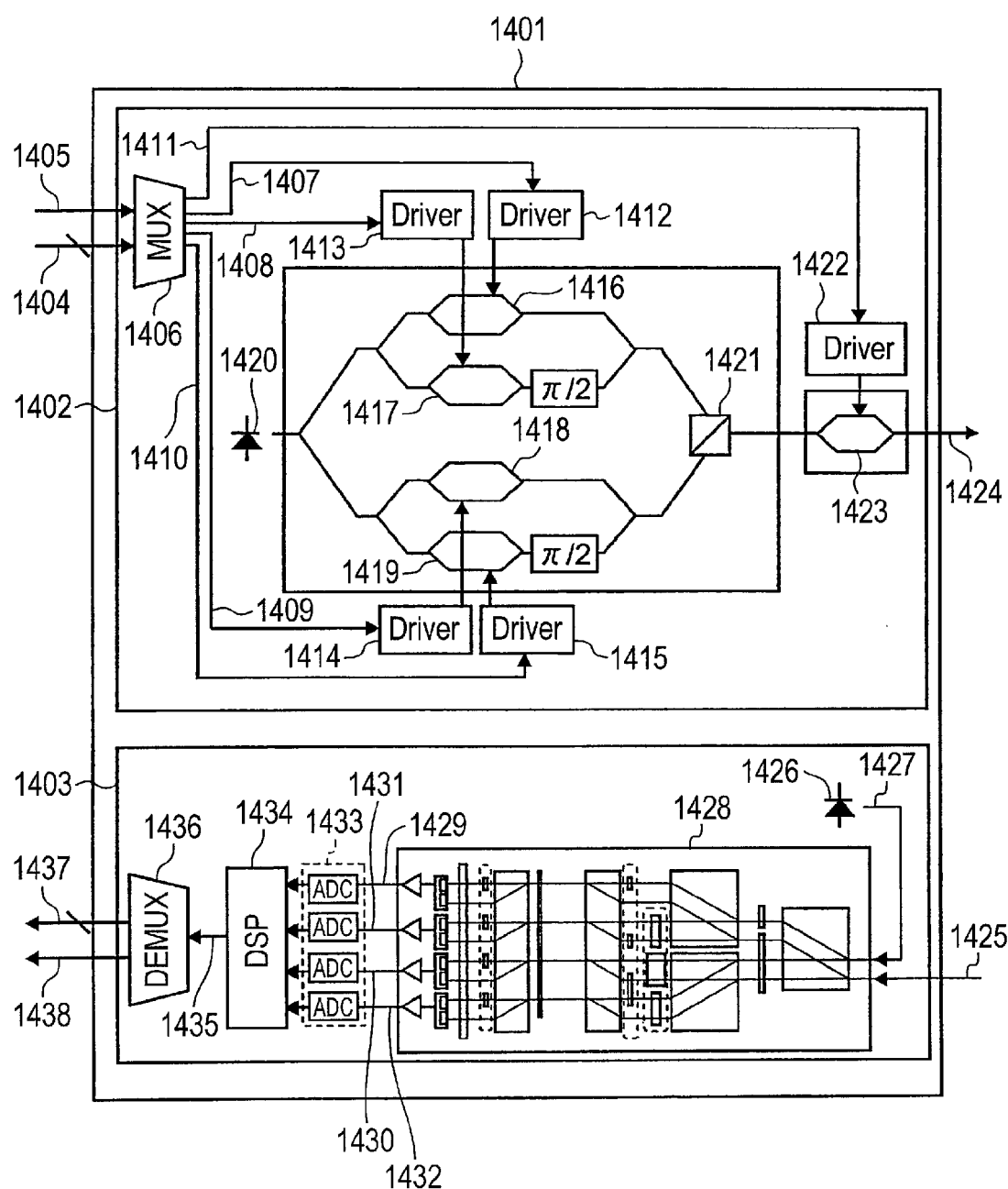
FIG. 14 is a configuration diagram of an optical transceiver using a DP-QPSK signal of the present invention.

FIG. 14 shows a configuration of a transceiver (optical communication module) of DP-QPSK of the present invention. As shown in FIG. 14, this transceiver 1401 consists of a transmission part 1402 and a reception part 1403. The transmission part 1402 generates four data modulated signals 1407, 1408, 1409, and 1410 and a clock signal 1411 from multiple data signals 1404 and a clock signal 1405 with a multiplexer 1406. The four data modulated signals 1407, 1408, 1409, and 1410 modulate phase modulators 1416, 1417, 1418, and 1419 using respective separate drivers 1412, 1413, 1414, and 1415, and perform signal modulation by DP-QPSK on the light emitted from a laser light source 1420. Incidentally, the light that was signal modulated by the phase modulators 1416, 1417 and the light that was signal modulated by the phase modulators 1418, 1419 are multiplexed with their polarizations being mutually orthogonal in a polarization beam splitter 1421, generating a light that is signal modulated by DP-QPSK. The clock signal 1411 is sent to a driver 1422, and a pulse carver 1423 adds pulse like modulation to the light that was signal modulated by DP-QPSK. A light 1424 thus modulated is transmitted.

In the reception part, the light being signal modulated by DP-QPSK is inputted to a demodulator 1428 similar as one shown in the fourth embodiment together with a local oscillator light 1427 from a laser light source 1426 prepared in the reception part, where I channel output signals 1429, 1430 and Q channel output signals 1431, 1432 are generated for each of the orthogonal polarization components of the inputted signal light. These are converted into digital signals by an AD converter 1433, and subsequently are inputted to a digital signal processing circuit 1434, where a regenerated signal 1435 is generated. This regenerated signal is separated into multiple data signals 1437 and a clock signal 1438 in a demultiplexer 1436.

Eighth Embodiment

Figure 15:
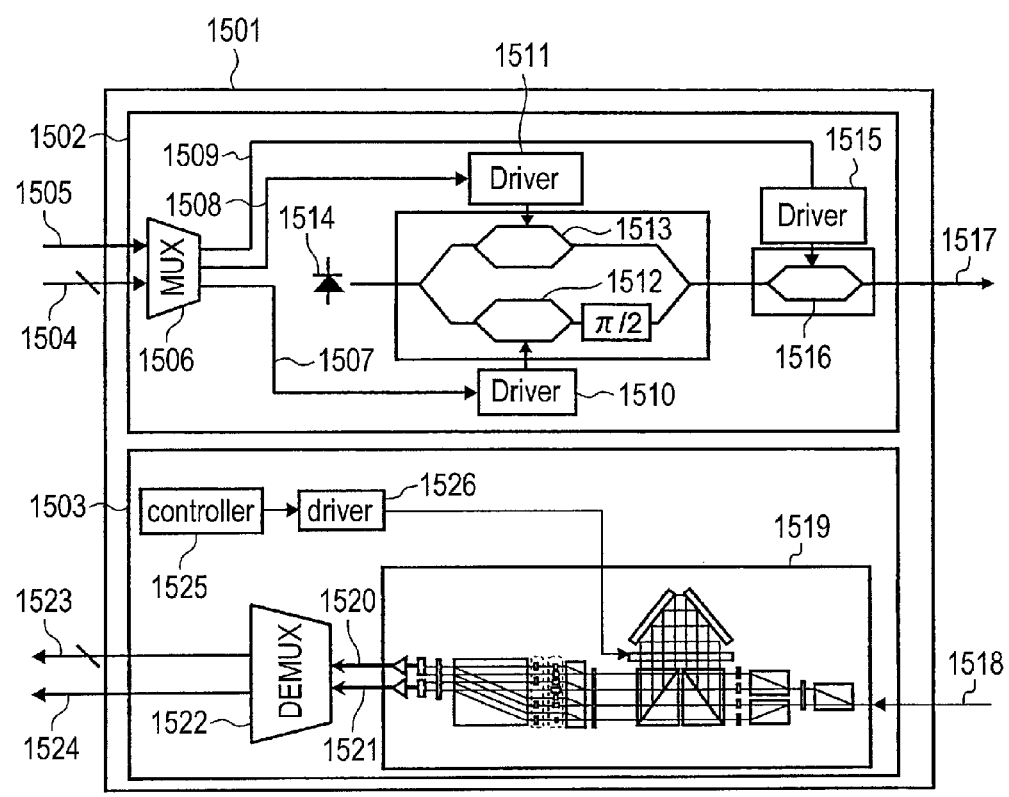
FIG. 15 is a configuration diagram of an optical transceiver using a DQPSK signal of the present invention.

FIG. 15 shows a configuration of a transceiver (optical communication module) of DQPSK of the present invention. As shown in FIG. 12, this transceiver 1501 consists of a transmission part 1502 and a reception part 1503. The transmission part 1502 generates a first data modulated signal 1507, a second data modulated signal 1508, and a clock signal 1509 from multiple data signals 1504 and a clock signal 1505 with a multiplexer 1506. The first data modulated signal 1507 and the second data modulated signal 1508 modulate a first phase modulator 1512 and a second phase modulator 1513 with a first driver 1510 and a second driver 1511, respectively, and perform modulation by differential phase shift keying on the light outputted from a laser light source 1514. The clock signal 1509 is sent to a third driver 1515, and a pulse carver 1516 adds a pulse like modulation to the light that was modulated by differential phase shift keying. A light 1517 thus modulated is transmitted.

The reception part inputs therein a light 1518 that was modulated by differential phase shift keying, and generates an I channel output signal 1520 and a Q channel output signal 1521 with a similar demodulator as shown in the fourth embodiment, which are separated into multiple data signals 1523 and a clock signal 1524 in a demultiplexer 1522 (a signal processing part). Moreover, a control part 1525 controls a driver 1526 for generating a driving signal to a heater for heating the silicon monocrystal, performing phase control of a delay interferometer.

According to the present invention, it is possible to realize a transceiver for a low-cost, high-performance, and large-capacity optical communication system, and therefore to contribute to increase in capacity of the communication capacity.

What is claimed is:

1. A demodulator for demodulating a phase shift keying signal, comprising:
   a first polarization separating unit adapted to perform a polarization separation which separates each of a DP-QPSK signal light and a local oscillator light which are input thereto, into a vertical polarization component and a horizontal polarization component;
   a first polarization converting unit adapted to convert the horizontal polarization component of the local oscillator light, which is separated by the first polarization separating unit, into a 45-deg polarization state;
   a second polarization converting unit adapted to convert the horizontal polarization component of the DP-QPSK signal light, which is separated by the first polarization separating unit, into a circular polarization state;
   a second polarization separating unit adapted to perform a polarization separation which separates the horizontal polarization component of the DP-QPSK signal light which is converted by the second polarization converting unit into a first vertical polarization component signal light and a first horizontal polarization component signal light, and further adapted to perform a polarization separation which separates the horizontal polarization component of the local oscillator light which is converted by the first polarization converting unit into a first vertical polarization component local oscillator light and a first horizontal polarization component local oscillator light;
   a third polarization converting unit adapted to perform a 90-deg polarization conversion of both the first horizontal polarization component signal light and the first horizontal polarization component local oscillator light;
   a first multiplexing unit adapted to output a first multiplexed light which is multiplexed light of the first vertical polarization component local oscillator light and first horizontal polarization component signal light which is converted by the third polarization converting unit, and outputs a second multiplexed light which is a multiplexed light of the first vertical polarization component signal light and the first horizontal polarization component local oscillator light which is converted by the third polarization converting unit;
   a fourth polarization converting unit adapted to perform a 45-deg polarization conversion of both the first multiplexed light and the second multiplexed light;
   a third polarization separating unit adapted to perform a polarization separation which separates each of the first multiplexed light and the second multiplexed light, both of which are converted by the fourth polarization converting unit, into a vertical polarization component and a horizontal polarization component, to output an interfering light useable for demodulating the DP-QPSK signal light.

2. The demodulator according to claim 1, wherein each of the first, the second and the third polarization separating units, is a beam displacer.

3. The demodulator according to claim 1, wherein each of the first, the second and the third polarization separating units, is a polarization beam splitter disposed so that an incoming beam and an outgoing beams thereto may become parallel to each other.

4. The demodulator according to claim 1, wherein the third polarization converting unit includes two parts which are physically separated into a part adapted to convert the first horizontal polarization component signal light and a part adapted to convert the first horizontal polarization component local oscillator light.

5. The demodulator according to claim 1, further comprising a skew correction unit provided on the optical path between the first polarization separating unit and the third polarization separating unit.

6. The demodulator according to claim 5, wherein the skew correction unit comprises a glass plate.

7. An optical transceiver, comprising:
   a transmission part adapted to transmit a light that was signal modulated by phase shift keying; and
   a reception part adapted to receive a light to be measured that was signal modulated by phase shift keying and to generate a plurality of data signals and a clock signal;
   wherein the reception part includes:
   a first polarization separating unit adapted to perform a polarization separation which separates each of a DP- QPSK signal light and a local oscillator light which are input thereto, into a vertical polarization component and a horizontal polarization component;

a first polarization converting unit adapted to convert the horizontal polarization component of the local oscillator light, which is separated by the first polarization separating unit, into a 45-deg polarization state;

a second polarization converting unit adapted to convert the horizontal polarization component of the DP-QPSK signal light, which is separated by the first polarization separating unit, into a circular polarization state;

a second polarization separating unit adapted to perform a polarization separation which separate the horizontal polarization component of the DP-QPSK signal light which is converted by the second polarization converting unit into a first vertical polarization component signal light and a first horizontal polarization component signal light, and further adapted to perform a polarization separation which separates the horizontal polarization component of the local oscillator light which is converted by the first polarization converting unit into a first vertical polarization component local oscillator light and a first horizontal polarization component local oscillator light;

a third polarization converting unit adapted to perform a 90-deg polarization conversion of both the first horizontal polarization component signal light and the first horizontal polarization component local oscillator light;

a first multiplexing unit adapted to output a first multiplexed light which is multiplexed light of the first vertical polarization component local oscillator light and first horizontal polarization component signal light which is converted by the third polarization converting unit, and outputs a second multiplexed light which is a multiplexed light of the first vertical polarization component signal light and the first horizontal polarization component local oscillator light which is converted by the third polarization converting unit;

a fourth polarization converting unit adapted to perform a 45-deg polarization conversion of both the first multiplexed light and the second multiplexed light;

a third polarization separating unit adapted to perform a polarization separation which separates each of the first multiplexed light and the second multiplexed light, both of which are converted by the fourth polarization converting unit, into a vertical polarization component and a horizontal polarization component.

* * * * *